United States Patent [19]

McHugh

[11] Patent Number: 5,450,296
[45] Date of Patent: Sep. 12, 1995

[54] AUXILIARY LAMP MOUNTING SYSTEM FOR A ROLL BAR

[76] Inventor: Larry McHugh, 7304-F Boudinot Dr., Springfield, Va. 22150

[21] Appl. No.: 96,001

[22] Filed: Jul. 23, 1993

[51] Int. Cl.6 .............................................. F21M 3/00
[52] U.S. Cl. ...................................... 362/66; 362/250; 362/428
[58] Field of Search ................. 362/66, 74, 70, 83.3, 362/250, 285, 287, 428

[56] References Cited

U.S. PATENT DOCUMENTS

| | | | |
|---|---|---|---|
| 3,229,945 | 1/1966 | Hartman | 362/74 |
| 4,192,427 | 3/1980 | Bergman | 362/66 |
| 4,473,868 | 9/1984 | Moore | 362/66 |
| 4,630,029 | 12/1986 | Hayward | 362/74 |
| 4,692,845 | 9/1987 | Wildhalm et al. | 362/66 |
| 4,707,014 | 11/1987 | Rich | 362/74 |
| 4,722,030 | 1/1988 | Bowden | 362/74 |
| 4,779,168 | 10/1988 | Montgomery | 362/66 |
| 4,787,665 | 11/1988 | Rich | 362/66 |
| 4,928,216 | 5/1990 | Carr | 362/66 |
| 5,171,083 | 12/1992 | Rich | 362/66 |

Primary Examiner—Richard R. Cole
Attorney, Agent, or Firm—Rogers & Killeen

[57] ABSTRACT

Auxiliary lamps may be mounted on a vehicle so that the lamps may be selectively moved out of the wind stream or into a forwardly facing position. The lamps are mounted on a rotatable rod at selectable positions anywhere along the length of the rod. The rod is rotated with a motor spaced from the rod out of the wind stream. The rod may be mounted on a roll bar or attached to a drip rail at the rear of the vehicle roof.

19 Claims, 3 Drawing Sheets

AUXILIARY LAMP MOUNTING SYSTEM FOR A ROLL BAR

The present invention relates to systems for mounting auxiliary lamps on a vehicle so that the auxiliary lamps may be selectively moved out of the vehicle wind stream or into a forwardly facing position, and more particularly to a system for mounting a rotatable lamp mounting rod on a vehicle where the motor for rotating the rod is out of the vehicle wind stream and in which auxiliary lamps of any type may be selectively positioned anywhere along the length of the rod.

Various types of vehicles carry auxiliary lamps (lamps in addition to those required by law) that protrude above the roof of the vehicle. Such lamps are typically mounted on a vehicle roof or roll bar and may serve various purposes, including those related to off-road recreational activities and security functions. In their operating position, auxiliary lamps direct light in front of the vehicle from a forward facing position above the line of sight of the driver. When the lamps are not being used they protrude above the roof of the vehicle in the wind stream, adding to vehicle aerodynamic drag and wind noise, making entry into garages and other height restricted areas sometimes impossible, and exposing the lamps to potential damage from debris.

When a vehicle is moving forward, air flows around the vehicle (that is, around any projections such as the vehicle body, windshield, etc.) creating a wind stream around the vehicle. An article not behind (relative to the direction of the wind stream) another object projects into the vehicle wind stream, and is out of the wind stream when it is behind another object.

Retractable auxiliary lamps are known, and while the known lamp retraction systems resolve some of the above-mentioned problems by withdrawing the lamps from the wind stream, the solutions pose new problems. For example, the lamps may be mounted on a separate rod carried above the vehicle roll bar that protrudes into the wind stream. Known systems use a motor to rotate the rod so that the lamps may be rotated rearwardly from a forward facing position to an upward facing position out of the wind stream. However, in such systems the motor is carried inside the rotating rod making motor maintenance difficult at best, and further increasing the drag of the mounting rod (the rod must be big enough to accommodate the motor). Further, a user cannot add lamps or change their location as these systems include complicated gear driven mechanisms that limit the locations of the lamps along the length of the mounting rod to those locations that have been predetermined. (See, for example, U.S. Pat. No. 4,722,030 to Bowden.)

To reduce the drag of the lamp mounting assembly, it is known to place auxiliary lamps in a roof-mounted spoiler. However, even though drag may be reduced, the height of the vehicle is increased, the lamp rotating mechanism is still complicated and difficult to reach and maintain, and lamps cannot be added or moved. (See, for example, U.S. Pat. Nos. 4,787,665 and 4,707,014 to Rich.) Manual systems, such as suggested by Widhalm, et al. in U.S. Pat. No. 4,692,845, move the lamps out of the wind stream, but are cumbersome to operate.

Accordingly, it is an object of the present invention to provide a novel auxiliary lamp mounting system with a motor-rotated lamp mounting rod on a vehicle roll bar that obviates the problems of the prior art.

It is a further object of the present invention to provide a novel auxiliary lamp mounting system in which a motor for rotating the lamp mounting rod is out of the wind stream in a position that facilitates motor maintenance.

It is a still a further object of the present invention to provide a novel auxiliary lamp mounting system with a motor operated lamp mounting rod in which the mounting rod accommodates lamps at selectable positions along its length.

It is a yet a further object of the present invention to provide a novel auxiliary lamp mounting system in which the motor for rotating the lamp mounting rod is attached to a roll bar support leg spaced from the mounting rod.

It is another object of the present invention to provide a novel auxiliary lamp mounting system in which the lamp mounting rod is attached to a drip rail at the rear of the roof of the vehicle and the motor for rotating the lamp mounting rod is carried below the rod out of the wind stream.

These and many other objects and advantages of the present invention will be readily apparent to one skilled in the art to which the invention pertains from a perusal of the claims, the appended drawings, and the following detailed description of preferred embodiments.

DESCRIPTION OF PREFERRED EMBODIMENTS

Figure 1:
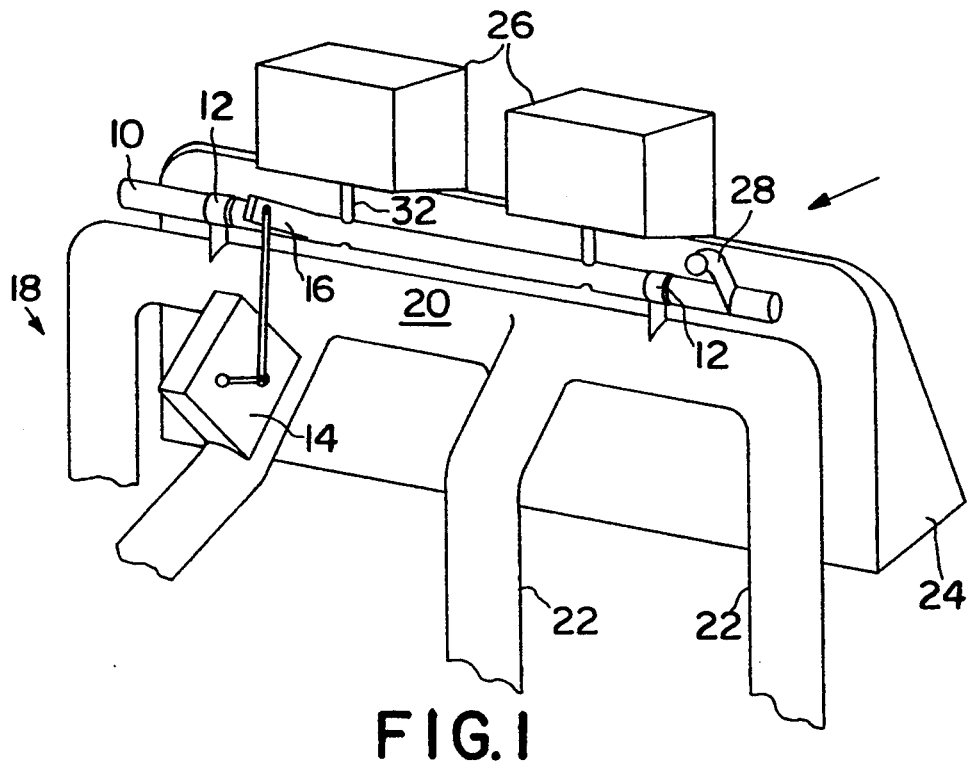
FIG. 1 is a pictorial representation of an embodiment of the present invention illustrating auxiliary lamps in an operating position on a roll bar.
Figure 2:
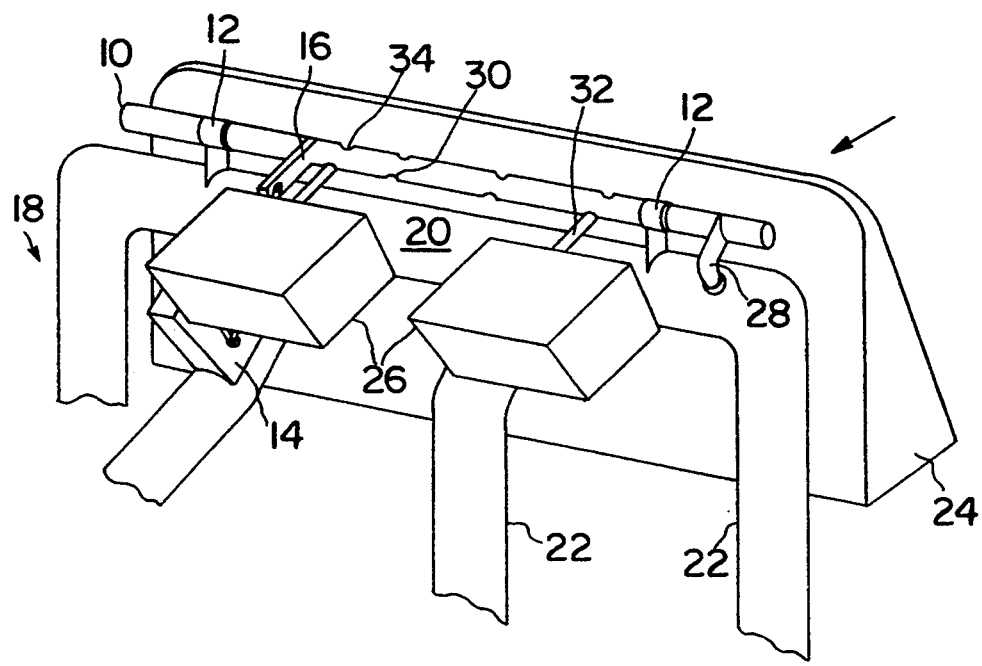
FIG. 2 is a pictorial representation of the embodiment of FIG. 1 illustrating the lamps in a position out of the wind stream.
Figure 3:
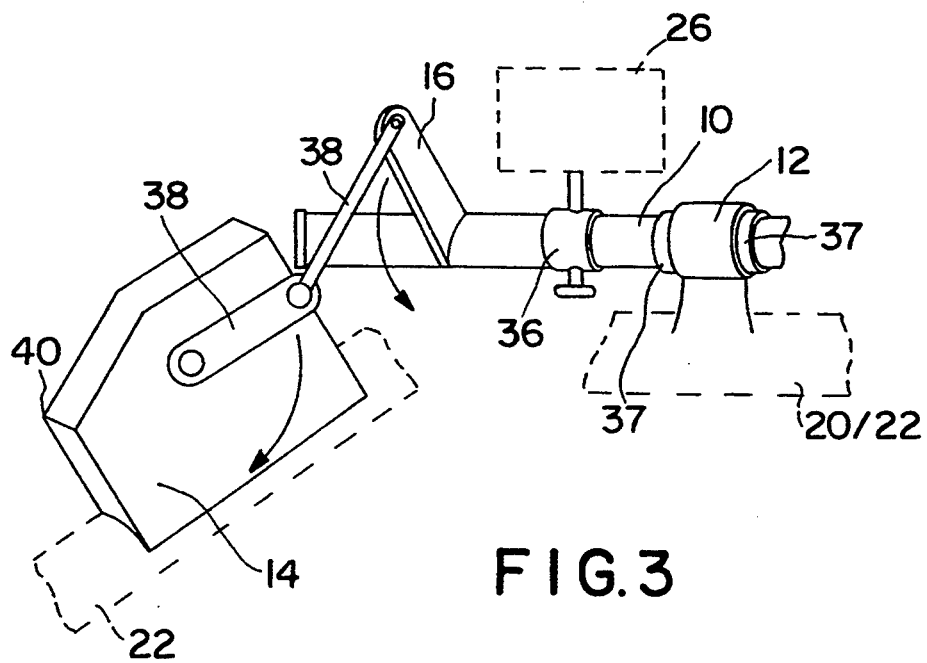
FIG. 3 is a pictorial representation of an embodiment of the present invention illustrating a motor-to-lamp rod linkage.

With reference now to FIGS. 1, 2 and 3, the auxiliary lamp mounting system of the present invention may include a lamp mounting rod 10 that is carried by two sleeves 12 and that is rotated by a motor 14 that moves an arm 16 attached to the rod 10. The sleeves 12 are attached to a part of a vehicle that will provide adequate support for the the rod and lamps, and the motor 14 is carried out of the wind stream. For example, the sleeves 12 may be attached to a roll bar 18 that has a crosspiece 20 and downwardly depending support legs 22, and the motor 14 may be mounted on one of the support legs 22 substantially out of the vehicle wind stream. The direction of wind when the vehicle is moving is shown by the arrows in FIG. 1 and 2. The vehicle may have a wind shielding element 24 that may be a cab, a wind shield, a spoiler or the like.

When the motor 14 is operated, the rod 10 rotates to move the auxiliary lamps 26 from a forward facing position as illustrated in FIG. 1, to an upward facing position substantially out of the wind stream as illustrated in FIG. 2, or to any other position selected by the operator. One or more stopper arms 28 may be attached to the rod 10 to prevent over-rotation.

With further reference to FIGS. 1, 2 and 3, the rod 10 may be any suitable shape, although if the rod protrudes into the wind stream the shape may be generally circular to reduce drag. The rod 10 may be hollow or solid and have a length that is appropriate for the number of lamps to be carried. In the absence of a specified length, the rod 10 may have a length about the same as the width of the vehicle. Lamps 26 may be affixed to the rod 10 at any position along its length using conventional mounting hardware. For example, the rod 10 may have plurality of holes 30 for receiving lamp mounting bolts 32. The bolts 32 may extend through the rod 10 and be fastened with a nut 34 on the opposite side of the rod. Alternatively, the lamps 26 may be mounted on the rod 10 with clamps (such as the screw-tightened clamp 36 illustrated in FIG. 3). Appropriate security devices may also be used to prevent theft. The lamps 26 may be conventional and need not be the same type. They may be mounted along the length of the rod between, and/or outside of, the sleeves 12.

The rod 10 is held in place by two or more sleeves 12 that extend partially or completely around the rod 10. The sleeves 12 are lubricated or include bearings to facilitate rotation of the rod 10. The rod 10 and sleeves 12 may include conventional devices for preventing lateral movement of the rod 10, such as rings or stoppers 37.

In one embodiment, the sleeves 12 may be attached to the crosspiece 20 of a roll bar 18 or its support legs 22, and are spaced apart sufficiently to hold the rod 10 in place. The rod 10 may be above the roll bar crosspiece 20 so that it protrudes into the wind stream, or may be lowered so that the rod 10 is out of the wind stream behind the roll bar crosspiece 20 or wind shielding element 24. The placement of the sleeves 12 and the rod 10 depends, at least in part, on the type of roll bar 18 and the wind shielding element 24.

The motor 14 and arm 16 may be more clearly seen in FIG. 3. The motor preferably generates rotational movement, such as the movement of linkage 38 indicated by its associated arrow. For example, a conventional motor for retracting automobile headlights may be suitable. When the motor 14 is operated, linkage 38 rotates arm 16 as indicated its associated arrow to rotate the rod through the desired amount (the amount of rotation depending on the desired aim of the lamps 26). The motor 14 may be housed in a housing 40 that is carried out of the wind stream. The housing 40 may be removable, or have a removable portion, to facilitate maintenance of the motor 14. The motor 14 is separated from the rod 10 to decrease the likelihood that motor maintenance will affect alignment of the lamps 26. Power for the motor 14 may be provided from the vehicle through appropriate electrical connections (not shown) that may include an operating switch inside the vehicle passenger compartment. The switch may move the lamps through 90° whenever the switch is operated (no intermediate positions available), or may move the lamps into any available position by stopping the motor at the desired interim position.

Figure 4:
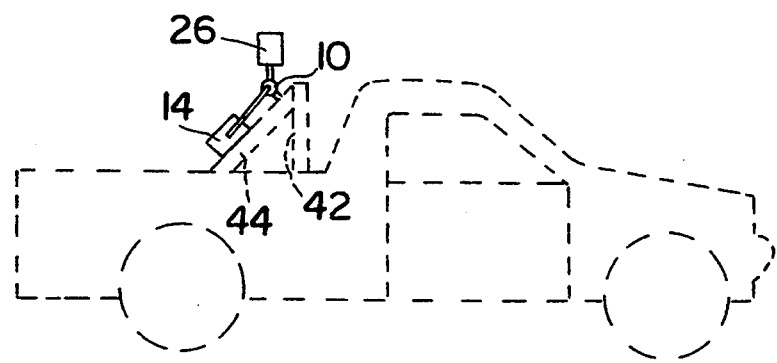
FIG. 4 illustrates an embodiment of the present invention in a pick-up truck.
Figure 5:
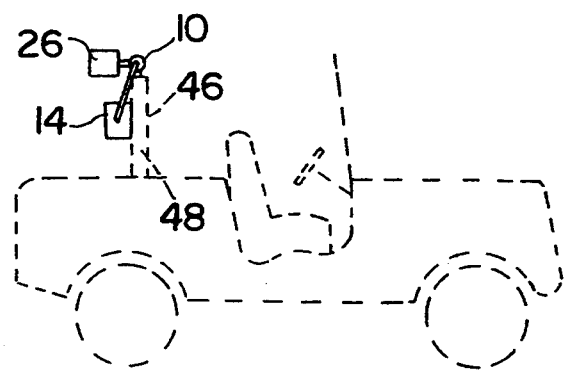
FIG. 5 illustrates an embodiment of the present invention in a utility vehicle.

With reference now to FIGS. 4 and 5, the present invention may be used with a roll bar 42 that has rearwardly depending support legs 44 (such as typically used in the bed of a pick-up truck). The motor 14 and the rod 10 may be mounted on the rearwardly depending support legs 44 out of the wind stream (for example, behind the pick-up cab or behind the roll bar crosspiece or support legs). The present invention may also be used with a roll bar 46 with downwardly depending support legs 48 (such as may be found in the rear of a utility vehicle, e.g., a Jeep ®). The motor 14 may be mounted on one of the downwardly depending support legs 48 and protected from the wind stream by the support leg 48 on which it is mounted.

Figure 6:
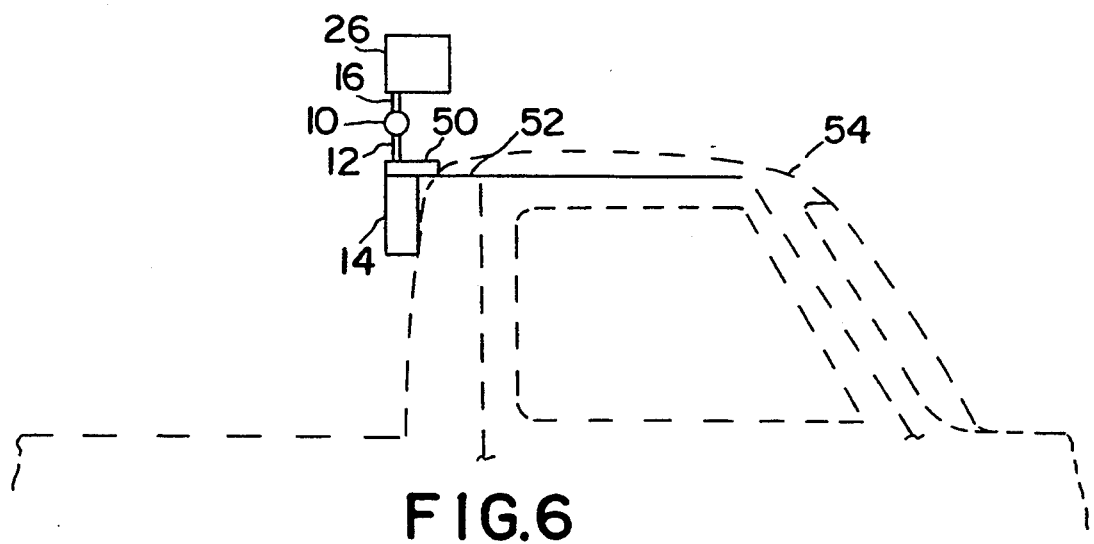
FIG. 6 is a side view of a pictorial depiction of a further embodiment of the present invention illustrating attachment to the rear of the roof of a vehicle.
Figure 7:
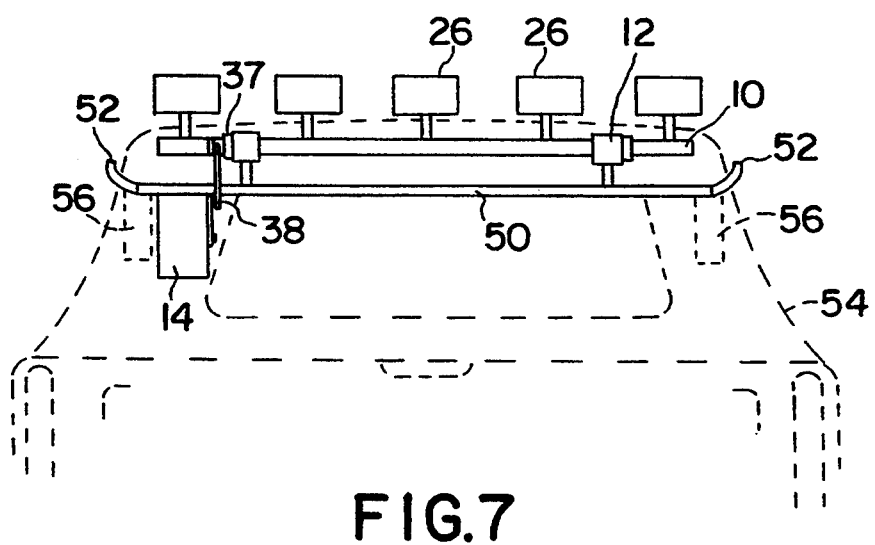
FIG. 7 is a pictorial depiction of a further embodiment of the present invention illustrating attachment to the rear of the roof of a vehicle as seen from the rear of the vehicle.

In another embodiment, and with reference to FIGS. 6 and 7, the present invention may be attached to the rear of a vehicle roof so that the motor 14 is out of the wind stream. For example, a support 50 for the sleeves 12 and motor 14 may be attached to the drip rail 52 that protrudes from the edge of the roof of a vehicle 54, or directly to the roof with appropriate mounting brackets 56. The support 50 may extend across the rear of the roof of the vehicle as illustrated in FIG. 7 or may include two sections, one at each side of the vehicle. The support 50 may be permanently attached, as by welding, or may be removably attached with conventional mounting hardware so that the support 50, motor 14, rod 10 and lamps 26 may be removed when use of the lamps is not envisioned. The motor 14 is desireably positioned so that it does not obstruct the view through the vehicle rear window and may be attached directly to the vehicle cab out of the wind stream. The sleeves 12 may also be attached directly to the vehicle cab. The lamp mounting rod 10 may be behind the roof out of the wind stream so that only the lamps 26 protrude into the wind stream when they are rotated into the position shown in FIG. 7.

While preferred embodiments of the present invention have been described, it is to be understood that the embodiments described are illustrative only and the scope of the invention is to be defined solely by the appended claims when accorded a full range of equivalence, many variations and modifications naturally occurring to those skilled in the art from a perusal hereof.

What is claimed is:

1. An improved system for mounting auxiliary lamps above a vehicle roll bar on a rotatable rod carried by the roll bar so that the lamps may be selectively moved into or out of a vehicle wind stream, the improvement comprising a motor for generating motion to rotate said rod, said motor being affixed to a downwardly depending roll bar support leg and being spaced from said rod in a position out of the vehicle wind stream.

2. An improved system for mounting auxiliary lamps above a vehicle on a rod rotatably carried by the vehicle so that the lamps may be selectively moved into or out of a vehicle wind stream, the improvement comprising a motor for generating motion to rotate said rod, said motor being affixed to a support member depending from a vehicle drip rail and being positioned below and spaced from said rod out of the vehicle wind stream.

3. A system for rotatably mounting auxiliary lamps above a vehicle so that the auxiliary lamps may be selectively moved out of a vehicle wind stream or into a forwardly facing position, the system comprising:

a rotatable rod carrying at least one auxiliary lamp in a selectable position along a length of said rod;

two spaced apart sleeves affixed to the vehicle for rotatably attaching said rod to the vehicle, each of said two sleeves having means for reducing friction with said rod to facilitate rotation thereof;

a motor affixed to the vehicle for generating motion to rotate said rod through about ninety degrees so that the auxiliary lamp may be moved from said forwardly facing position to an upwardly facing position that is substantially out of the wind stream, said motor being carried apart from and below said rod in a position substantially out of the wind stream and being electrically connected to the vehicle for receiving operating power therefrom; and an arm affixed to said rod and moved by said motor for translating movement generated by said motor into rotation of said rod.

4. The system of claim 3 further comprising means for attaching a selectable number and type of said auxiliary lamps to said rod.

5. The system of claim 4 wherein said means for attaching comprises a plurality of mounting holes completely through said rod, each of said lamps being attached to said rod on a mounting member that extends through one of said mounting holes.

6. The system of claim 4 wherein said attaching means comprises mounting clamps for the lamps.

7. The system of claim 3 wherein said two sleeves and said motor are attached to a support member attached to the vehicle.

8. The system of claim 7 wherein said support member is a roll bar.

9. The system of claim 8 wherein said motor is attached to a support leg for said roll bar.

10. The system of claim 8 wherein said rod is out of the wind stream behind a crosspiece for said roll bar.

11. The system of claim 7 wherein said support member is attached to a drip rail at an edge of the vehicle roof.

12. The system of claim 7 wherein said support member is removably attached to the vehicle with plural mounting brackets.

13. The system of claim 3 wherein said friction reducing means comprises bearings.

14. The system of claim 3 wherein said friction reducing means comprises a lubricant.

15. The system of claim 3 wherein said rod is round.

16. The system of claim 3 wherein said rod is solid.

17. The system of claim 3 wherein said rod is hollow.

18. The system of claim 3 wherein at least one said auxiliary lamp is carried by said rod between said two spaced apart sleeves and at least one said auxiliary lamp is carried by said rod and is not located between said sleeves.

19. The system of claim 3 further comprising at least one stopper arm attached to said rod for preventing rotation of said rod beyond about ninety degrees.

* * * * *